Patented Oct. 3, 1950

2,524,358

UNITED STATES PATENT OFFICE 2,524,358

PREPARING COLLOIDAL SILICA SOLUTIONS

Paul Robey, Metuchen, N. J., assignor to Socony-Vacuum Oil Company, Incorporated, a corporation of New York No Drawing. Application December 30, 1949, Serial No. 136,159

14 Claims. (Cl. 106—287)

The present invention relates to the preparation of colloidal solutions and, more particularly, to the preparation of colloidal solutions of silica.

This application is a continuation-in-part of my application Serial No. 728,196, filed February 12, 1947, now abandoned.

The use of colloidal silica solutions for coating surfaces or for impregnating materials for strengthening, stiffening, dressing or preserving them as, for instance, stiffening textile fabrics or preserving stone, or for mixing with materials to make plastic masses or for other like purposes, has been known for at least about fifteen years. The alkyl esters including the glycol esters of silicic acid have been the principal raw materials from which the useful colloidal solutions of silica have been prepared.

Colloidal solutions of silica have usually been prepared by hydrolysis of alkyl silicates. These esters are insoluble in water however, and therefore, hydrolysis is extremely slow. Intimate mixing of the esters and water, as by violent agitation, speeds up hydrolysis; yet, the rate of hydrolysis is still rather slow when the solutions are neutral. In the presence of alkaline materials, the reaction proceeds extremely rapidly and gels or gelatinous precipitates are formed. In the presence of mineral acids, such as hydrochloric acid, hydrolysis is less rapid and more easily controlled. Common solvents for the ester and water, for example, alcohols and acetone, and water-soluble emulsifying agents, typified by soaps, have also been used in hydrolyzing alkyl silicates.

One early method for preparing colloidal solutions of silica is that described in U. S. Patent No. 1,809,755. In this method, a silicic acid ester is mixed with a solvent or mixture of solvents adapted to carry water either in solution or dispersion, for example, denatured or other form of alcohol, acetone or the like. The proportion of water, in this method, must not exceed that required to convert the ester into the corresponding alcohol and silica, and is so adjusted that the material, after reaction is complete, contains no free water. This method suffers from several disadvantages, however, inasmuch as the solvent dilutes the product and adds to its cost. Moreover, a small fraction of silica, instead of going into colloidal solution, forms a flocculent precipitate and is lost for subsequent use as a binder.

The use of a water-soluble emulsifying agent in the hydrolysis of the organic esters of inorganic acids is shown in U. S. Patent No. 2,058,844. In this instance, an alkyl silicate is emulsified with water by means of an emulsifying agent which is at least partially soluble in water and may be either soluble or insoluble in the ester. Creamy emulsions are formed, which set to a solid within a matter of from several minutes to a few days.

U. S. Patent No. 2,299,552 contains the following description of a method of preparing colloidal solutions of silica: 100 parts by weight of 95 per cent ethyl alcohol and 10 parts by weight of water, are mixed. To this mixture is added a small amount of acid, for example, one-half part by weight of a solution of one part of hydrochloric acid in 100 parts of water. The mixture then is boiled under a reflux condenser for one hour. The amount of water is substantially less than that necessary to hydrolyze all the ethyl silicate present. Thus, it is manifest that the hydrolysis is only partial.

The brochure, "Ethyl Silicate," published June, 1945 by Carbide and Carbon Chemicals Corporation, describes two methods for preparing colloidal solutions of silica, known as the "One-Step" and the "Two-Step" methods of hydrolysis.

The "One-Step" method involves mixing 60 volumes of "condensed" ethyl silicate or tetraethyl orthosilicate, 32 volumes of 95 per cent ethanol and 8 volumes of 0.3 to 5.0 per cent aqueous hydrochloric acid solution.

The "Two-Step" method of hydrolysis which permits the production of higher concentrations of silica, is the one most generally used. Partially hydrolyzed solutions of the ester are prepared from which in the second step the completely hydrolyzed solutions are obtained. To prepare the partially hydrolyzed solution using tetraethyl orthosilicate, 37 volumes of tetraethyl orthosilicate, 12 volumes of 95 per cent ethanol and one volume of 0.3 per cent aqueous hydrochloric acid solution are mixed. After standing at least 12 hours, 100 volumes of the foregoing are mixed with 7 volumes of water.

To make a colloidal solution using "condensed" ethyl silicate, 40 volumes of "condensed" ethyl silicate, 9 volumes of 95 per cent ethanol and 1 volume of 0.3 per cent aqueous hydrochloric acid solution are mixed. After standing at least 12 hours, 12.5 volumes of the foregoing solution are mixed with one volume of water.

Prior art methods involving use of a solvent in preparing colloidal solutions of silica have the disadvantage that a certain fraction of the silica formed by hydrolysis, instead of going into colloidal solution, forms a flocculent precipitate. The amount of this precipitate is small when pure tetraethyl orthosilicate is used, but assumes very noticeable proportions when the solution is prepared from so-called "condensed" ethyl silicate.

"Condensed" ethyl silicate is a commercial product containing, besides tetraethyl orthosilicate, a certain proportion of polysilicates. Its price is much lower than that of pure tetraethyl orthosilicate. The silica precipitate aforementioned represents a loss of silica binder, and must be removed for some purposes.

It will be noticed that all the prior art methods, in order to hydrolyze the ethyl silicate, involve the use of materials which can be broadly designated "dispersing agents" for the ethyl silicate and/or water, as illustrated above by a common solvent such as methanol or acetone, and by water-soluble soaps. It has now been discovered that formation of silica precipitates can be avoided by first preparing a "completely hydrolyzed" solution of silica in the absence of a dispersing agent such as a common solvent or emulsifying agent. This "completely hydrolyzed" solution of silica can be converted into a "partially hydrolyzed" solution, by addition of an excess of ethyl silicate. These "partially hydrolyzed" solutions, due to their relatively low concentration of silica, are stable for long periods of time without gelling. They can be converted again into "completely hydrolyzed" solutions by reacting them with water. "Completely hydrolyzed" solutions gell within a period ranging from a few hours to several weeks, depending primarily on their concentration.

It is an object of the present invention, therefore, to provide a method for preparing clear, stable, substantially precipitate-free "partially hydrolyzed" colloidal solutions of silica.

The novel method of this invention involves: intimately mixing an alkyl silicate having up to five carbon atoms in the alkyl group, with an amount of water in excess of that required to cause complete hydrolysis in the absence of a dispersing agent, until the mixture thereof becomes homogeneous, whereupon a "completely hydrolyzed" solution is formed; and adding to the "completely hydrolyzed" solution a quantity of the same or another alkyl silicate greater than necessary to react with the excess water, whereby a "partially hydrolyzed" colloidal silica solution is formed. The "partially hydrolyzed" solution so produced contains practically no precipitated silica. It should be allowed to stand for a few hours before use, in order to give the excess water time to be consumed by hydrolysis.

A modification of the foregoing novel procedure is the following. Following formation of a "completely hydrolyzed" solution, a quantity of alkyl silicate sufficient to react with the excess water is added, and the reaction mixture thereof is allowed to react until the excess water is essentially consumed; and then a further quantity of alkyl silicate is added to form a "partially hydrolyzed" colloidal silica solution. When this modified procedure is followed, the "partially hydrolyzed" solution can be taken in use immediately.

It will be noted that contrary to prior art practices there is no common solvent added at start, when the "completely hydrolyzed" solution is prepared. This is instrumental in avoiding formation of silica precipitates. Consequently, since the alkyl ester and water are not miscible it is necessary to bring the ester and the water in intimate contact by relatively vigorous agitation. Any mechanical means for intimately bringing into contact the two immiscible liquids such as shaking or stirring the mixture can be used. As the hydrolysis progresses increasing amounts of alcohol are produced which, however, do not cause silica to precipitate. Finally, the liquid becomes homogeneous and consists of a colloidal solution of silica in alcohol, a so called "alcoholosol", and excess water. In the second step this "completely hydrolyzed" solution is converted into a "partially hydrolyzed" solution by adding a relatively large amount of ester.

The present method offers its greatest advantage in the preparation of colloidal silica solutions from "condensed" ethyl silicate, because of the greater tendency of this product than of pure tetraethyl orthosilicate to precipitate silica. Furthermore, it makes it possible, when desirable, to prepare solutions having higher concentrations of silica than can be attained by those methods that involve the addition of a common solvent such as ethyl alcohol.

As indicated above, the alkyl silicate is one having up to five carbon atoms in the alkyl group, such as pure or "condensed" methyl, ethyl, propyl, butyl or amyl silicates.

It is advantageous to have a small amount of an acid catalyst present during the hydrolysis. This is particularly so when a "condensed" alkyl silicate is used; in contrast, pure tetraethyl orthosilicate can be hydrolyzed in the absence of a catalyst. Acids suitable as hydrolysis catalysts herein include: hydrochloric, phosphoric, oxalic, maleic, sulfuric, acetic, formic, etc. Hydrochloric acid has proven particularly useful. The amount of acid used is relatively small and, in general, about 0.2–2 per cent of hydrogen chloride in the water used for hydrolysis is satisfactory.

The reaction to hydrolyze alkyl esters of silicic acid can be written as follows:

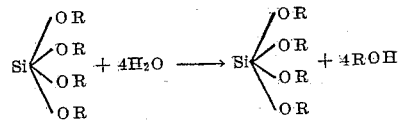

where R is an alkyl group. The silicic acid formed dehydrates, in turn, to $SiO_2$, so that the complete reaction is represented by the equation $$R_4SiO_4 + 2H_2O \rightarrow SiO_2 + 4ROH$$

This equation provides a means for computing the amount of water necessary to completely hydrolyze a given amount of alkyl silicate.

Illustrative of the present method are the following non-limiting examples:

*Example I*

| Solution A: | Volumes |
|---|---|
| "Condensed" ethyl silicate | 90.0 |
| Water | 18.7 |
| Hydrochloric acid (conc.) | 0.4 |
| Solution B: | |
| "Condensed" ethyl silicate | 50.0 |
| Solution C: | |
| "Condensed" ethyl silicate | 180.0 |
| Total | 339.1 |

The hydrochloric acid is dissolved in the water and with the ethyl silicate is charged to an acid-resistant container provided with a high-speed stirrer, a cooling jacket and a cover. The mixture is stirred vigorously until homogeneous. This usually will take about 10 to 15 minutes. Then solution B is mixed with the homogenized solution A and allowed to stand overnight. Thereafter, solution C is added to the mixture of A and B.

In the preparation of solution A, water is present in an amount in excess of that theoretically necessary to hydrolyze the ethyl silicate. This is essential, if the silica formed is to go into a colloidal solution; excess of ethyl silicate invariably leads to a complete precipitation of the silica in a gelatinous form. The excess of water should be about 20 to 50 per cent. Solution A of the examples has an excess of about 30 per cent over the theoretical amount.

The amount of ethyl silicate added as solution B is sufficient to react with the excess water present in solution A by hydrolysis. This reaction progresses slowly and requires several hours dependent upon the concentration of mineral acid catalyst. For the concentration given in the example at least about 10 hours is desirable.

The balance of the ethyl silicate is then added as solution C. A clear, stable liquid is obtained. This product can be stored for relatively long periods of time without gelation. It contains about 10 per cent of silica in colloidal solution, i. e., this represents the hydrolyzed portion of the solution.

This "partially hydrolyzed" solution can be further hydrolyzed by the addition of water. The reaction progresses slowly, but can be accelerated by incorporating some additional acid catalyst with the water. For many purposes, solutions in which a small fraction of ethyl silicate has been left unhydrolyzed, have proved most useful. Thus to 339.1 volumes of the foregoing "partially hydrolyzed" solution of Example I can be added 30.0 volumes of water. In the solution thus produced about 94 per cent of the ethyl silicate has been hydrolyzed; it contains about 23.5 per cent silica in colloidal solution. The "partially hydrolyzed" solution contains enough alcohol formed by hydrolysis, to allow the water to mix in homogeneously.

It is also possible to add the whole amount of ethyl silicate of solutions B and C (230 volumes) in a single step. In that case, however, the final solution will contain some unreacted water, which will require several hours to be consumed. When a "completely hydrolyzed solution" is prepared from the above "partially hydrolyzed" solution, the necessary additional water (30.0 volumes) should be added only after the unreacted water mentioned has ben consumed. Otherwise, there would be too much water present to mix in homogeneously.

When a solution of somewhat lower silica concentration is desired, some water soluble solvent like ethyl alcohol, acetone, etc. may be incorporated into the "partially hydrolyzed" solution. This, at the same time, improves the stability of the solution. However, it must be emphasized that the order of adding the alcohol is critical, inasmuch as no alcohol must be present at start, in order to avoid formation of silica precipitates during hydrolysis. A novel colloidal solution which has proved stable for a period of several years, is produced by the following operations.

*Example II*

Solution A: Volumes
  "Condensed" ethyl silicate_____ 90.0
  Water _____ 18.7
  Hydrochloric acid (conc.)_____ 0.4
Solution B:
  "Condensed" ethyl silicate_____ 50.0
  Ethyl alcohol (95%)_____ 60.0
Solution C:
  "Condensed" ethyl silicate_____ 300.0

Total _____ 519.1

The procedure is exactly the same as set forth in Example I. The resulting "partially hydrolyzed" solution contains about 7.7 per cent hydrolyzed silica. To prepare a "completely hydrolyzed" solution, 45.8 volumes of water in which 2.4 volumes of concentrated hydrochloric acid have been dissolved, are added. Hydrolysis is essentially completed within an hour. The resulting "completely hydrolyzed" solution has a silica concentration of about 22.3 per cent. It should be noted, however, that the hydrolysis is not quite complete inasmuch as only about 94 per cent of the ethyl silicate originally employed has been hydrolyzed. Such a solution can be utilized advantageously, e. g., as a paint vehicle, and is used for that purpose in my copending application Serial No. 728,195, filed February 12, 1947 now abandoned.

Those skilled in the art will understand that, while the novel process has been illustrated by discussion of the preparation of colloidal solutions of silica from ethyl silicate, other alkyl silicates may be used. Furthermore, while it is preferred to use hydrochloric acid as a catalyst, other acids like sulfuric acid, acetic acid etc., are usable.

I claim:

1. The method for preparing a clear, stable, substantially precipitate-free "partially hydrolyzed" colloidal silica solution, which comprises: intimately mixing an alkyl silicate, the alkyl groups of which contain up to five carbon atoms, and water in excess of the stoichiometric equivalent, in the absence of an added dispersing agent, until the mixture thereof becomes homogeneous, whereupon a "completely hydrolyzed" solution is formed; and adding to said "completely hydrolyzed" solution an additional quantity of said alkyl silicate to react with said excess water, whereby said "partially hydrolyzed" colloidal silica solution is formed.

2. The method as described and set forth in claim 1 wherein a water-miscible solvent is added to the "completely hydrolyzed" solution.

3. The method as described and set forth in claim 1 wherein the alkyl silicate is ethyl silicate.

4. The method as described and set forth in claim 1 wherein an acid catalyst is intimately mixed with said silicate and water.

5. The method for preparing a clear, stable, substantially precipitate-free "partially hydrolyzed" colloidal silica solution, which comprises: intimately mixing "condensed" ethyl silicate and water in excess of the stoichiometric equivalent, in the presence of an acid catalyst and in the absence of an added dispersing agent, until the mixture thereof becomes homogeneous, whereupon a "completely hydrolyzed" solution is formed; and adding to said "completely hydrolyzed" solution an additional quantity of said silicate to react with said excess water, whereby said "partially hydrolyzed" colloidal silica solution is formed.

6. The method for preparing a clear, stable, substantially precipitate-free "partially hydrolyzed" colloidal silica solution, which comprises: intimately mixing a mixture consisting essentially of an alkyl silicate, the alkyl groups of which contain up to five carbon atoms and water in excess of the stoichiometric equivalent, until the mixture thereof becomes homogeneous, whereupon a "completely hydrolyzed" solution is formed; and adding to said "completely hydrolyzed" solution an additional quantity of said silicate to react with said excess water, whereby said "partially hydrolyzed" colloidal silica solution is formed.

7. The method for preparing a clear, stable, substantially precipitate-free "partially hydrolyzed" colloidal silica solution, which comprises: intimately mixing a mixture consisting essentially of an alkyl silicate, the alkyl groups of which contain up to five carbon atoms and water in excess of the stoichiometric equivalent, and a small amount of acid catalyst, until the mixture thereof becomes homogeneous, whereupon a "completely hydrolyzed" solution is formed; and adding to said "completely hydrolyzed" solution an additional quantity of said silicate to react with said excess water, whereby said "partially hydrolyzed" colloidal silica solution is formed.

8. The method for preparing a clear, stable, substantially precipitate-free "partially hydrolyzed" colloidal silica solution, which comprises: intimately mixing an alkyl silicate, the alkyl groups of which contain up to five carbon atoms, and water in excess of the stoichiometric equivalent, in the absence of an added dispersing agent, until the mixture thereof becomes homogeneous, whereupon a "completely hydrolyzed" solution is formed; adding to said "completely hydrolyzed" solution a quantity of said alkyl silicate sufficient to react with said excess water, and allowing the reaction mixture thereof to react until said excess water is essentially consumed; and adding to the last-mentioned reaction mixture an excess of said alkyl silicate, whereby said "partially hydrolyzed" colloidal silica solution is formed.

9. The method as described and set forth in claim 8 wherein a water-miscible solvent is added to the "completely hydrolyzed" solution.

10. The method as described and set forth in claim 8 wherein the alkyl silicate is ethyl silicate.

11. The method as described and set forth in claim 1 wherein an acid catalyst is intimately mixed with said silicate and water.

12. The method for preparing a clear, stable, substantially precipitate-free "partially hydrolyzed" colloidal silica solution, which comprises: intimately mixing "condensed" ethyl silicate and water in excess of the stoichiometric equivalent, in the presence of an acid catalyst and in the absence of an added dispersing agent, until the mixture thereof becomes homogeneous, whereupon a "completely hydrolyzed" solution is formed; adding to said "completely hydrolyzed" solution a quantity of said silicate sufficient to react with said excess water, and allowing the reaction mixture thereof to react until said excess water is essentially consumed; and adding to the last-mentioned reaction mixture an excess of said silicate whereby said "partially hydrolyzed" colloidal silica solution is formed.

13. The method for preparing a clear, stable, substantially precipitate-free "partially hydrolyzed" colloidal silica solution, which comprises: intimately mixing a mixture consisting essentially of an alkyl silicate, the alkyl groups of which contain up to five carbon atoms and water in excess of the stoichiometric equivalent, until the mixture thereof becomes homogeneous, whereupon a "completely hydrolyzed" solution is formed; adding to said "completely hydrolyzed" solution a quantity of said alkyl silicate sufficient to react with said excess water, and allowing the reaction mixture thereof to react until said excess water is essentially consumed; and adding to the last-mentioned reaction mixture an excess of said alkyl silicate, whereby said "partially hydrolyzed" colloidal silica solution is formed.

14. The method for preparing a clear, stable, substantially precipitate-free "partially hydrolyzed" colloidal silica solution, which comprises: intimately mixing a mixture consisting essentially of an alkyl silicate, the alkyl groups of which contain up to five carbon atoms and water in excess of the stoichiometric equivalent, and a small amount of acid catalyst, until the mixture thereof becomes homogeneous, whereupon a "completely hydrolyzed" solution is formed; adding to said "completely hydrolyzed" solution a quantity of said alkyl silicate sufficient to react with said excess water, and allowing the reaction mixture thereof to react until said excess water is essentially consumed; and adding to the last-mentioned reaction mixture an excess of said alkyl silicate, whereby said "partially hydrolyzed" colloidal silica solution is formed.

PAUL ROBEY.

REFERENCES CITED

The following references are of record in the file of this patent:

UNITED STATES PATENTS

| Number | Name | Date |
| --- | --- | --- |
| 2,058,844 | Vaughn | Oct. 27, 1936 |